US010224861B2

(12) United States Patent
Granziera et al.

(10) Patent No.: US 10,224,861 B2
(45) Date of Patent: Mar. 5, 2019

(54) ROTATING ELECTRIC MACHINE FOR A MOTOR VEHICLE

(71) Applicant: VALEO EQUIPEMENTS ELECTRIQUES MOTEUR, Creteil (FR)

(72) Inventors: Cyril Granziera, Paris (FR); Ronald Malbranque, Vincennes (FR)

(73) Assignee: Valeo Equipements Electriques Moteur, Creteil (FR)

(*) Notice: Subject to any disclaimer, the term of this patent is extended or adjusted under 35 U.S.C. 154(b) by 296 days.

(21) Appl. No.: 15/313,311

(22) PCT Filed: Apr. 28, 2015

(86) PCT No.: PCT/FR2015/051146
§ 371 (c)(1),
(2) Date: Nov. 22, 2016

(87) PCT Pub. No.: WO2015/177428
PCT Pub. Date: Nov. 26, 2015

(65) Prior Publication Data
US 2017/0194892 A1   Jul. 6, 2017

(30) Foreign Application Priority Data

May 22, 2014   (FR) .................................... 14 54617

(51) Int. Cl.
*H02P 9/10* (2006.01)
*H02P 29/40* (2016.01)
(Continued)

(52) U.S. Cl.
CPC ............ *H02P 29/664* (2016.11); *H02P 9/107* (2013.01); *H02P 29/40* (2016.02); *H02P 29/60* (2016.02)

(58) Field of Classification Search
USPC ............................. 322/34, 81; 318/706, 801
See application file for complete search history.

(56) References Cited

U.S. PATENT DOCUMENTS 3,026,731 A * 3/1962 Maeder ................. G01C 19/14
244/3.2
3,467,844 A * 9/1969 Bird ....................... H02K 19/20
310/111
(Continued)

OTHER PUBLICATIONS

Kidd A L, "Successful selection and operation of overcurrent and residual current protective measures", Installation Engineering Esigning and Maintaining Successful Systems, 1988., Third International Conference on London, UK, London, UK,IEE, UK, (Jan. 1, 1988), ISBN 978-0-85296-362-3, pp. 50-57, XP006518734 [A] 1,3-6 * col. 2; figure 4 *.

*Primary Examiner* — Pedro J Cuevas
(74) *Attorney, Agent, or Firm* — Berenato & White, LLC (57) ABSTRACT

A rotating electrical machine for a motor vehicle comprising a rotor (2) supplied with an excitation current (ie), a stator (3) comprising a polyphase winding and coupled to the rotor (2), a thermal protection module (4) suitable for evaluating at least one temperature (T1, T2, T3) in the machine and for comparing the temperature with an associated thermal protection threshold (Th), a control device (5) supplying the excitation current (ie) depending on an operation mode command (RQ) and the temperature comparison, so as to operate the rotating electrical machine (1) according to a mode of operation chosen from a nominal generator mode in which the machine is configured to deliver a first maximum power or at least one extended generator mode in which the machine is configured to deliver a second maximum power greater than said first maximum power.

17 Claims, 5 Drawing Sheets

(51) Int. Cl.
*H02P 29/60* (2016.01)
*H02P 29/66* (2016.01)

(56) References Cited

U.S. PATENT DOCUMENTS

| | | | | |
|---|---|---|---|---|
| 3,781,616 | A * | 12/1973 | Mokrytzki | B60L 9/22 318/801 |
| 4,277,735 | A * | 7/1981 | Okuyama | 318/766 |
| 4,455,522 | A * | 6/1984 | Lipo | H02P 27/048 318/807 |
| 4,641,074 | A * | 2/1987 | Hamilton, Jr. | H02P 1/46 318/706 |
| 4,683,411 | A * | 7/1987 | Hamilton, Jr. | H02P 1/46 318/706 |
| 4,757,240 | A * | 7/1988 | Mizobuchi | B60L 9/22 318/52 |
| 6,784,634 | B2 * | 8/2004 | Sweo | H02P 9/007 290/46 |
| 2003/0052643 | A1 * | 3/2003 | Sweo | H02P 9/007 318/801 |
| 2006/0238172 | A1 | 10/2006 | Maehara et al. | |
| 2012/0262130 | A1 | 10/2012 | Nakajima et al. | |

\* cited by examiner

ROTATING ELECTRIC MACHINE FOR A MOTOR VEHICLE

CROSS-REFERENCE TO RELATED APPLICATIONS AND CLAIM TO PRIORITY

This application is a national stage application of International Application No. PCT/FR2015/051146 filed Apr. 28, 2015, which claims priority to French Patent Application No. 1454617 filed May 22, 2014, the disclosures of which are incorporated herein by reference and to which priority is claimed.

FIELD OF THE INVENTION

The present invention relates to a rotary electrical machine for a motor vehicle.

It has a particular, but non-limiting application in the field of motor vehicle alternator-starters.

BACKGROUND OF THE INVENTION

In a motor vehicle comprising a thermal engine and a rotary electrical machine such as an alternator or an alternator-starter, a machine of this type comprises in a non-limiting manner:
a rotor comprising an inductor in which an excitation current is injected; and
a stator comprising a polyphase winding.

In alternator mode, which is also known as generator mode, the machine makes it possible to transform a movement of rotation of the rotor driven by the thermal engine of the vehicle into an electric current induced in the phases of the stator. A rectifier bridge which is connected to the phases of the stator makes it possible to rectify the sinusoidal induced current into a direct current which supplies consumers in the vehicle, as well as a battery.

In particular because of increasing electrification of motor vehicles and development of vehicles of the hybrid type, the requirements for current output in alternator mode on the on-board network of the vehicle are becoming increasingly great. The rotary electrical machine has dimensions to provide a nominal direct current which corresponds substantially to the maximum current which the machine can provide. However, this maximum current is well above the average consumption of current of the motor vehicle. In fact, the motor vehicle does not need a substantial current continually, and the average current provided by the machine is well below the maximum current which it can supply.

A disadvantage of this prior art consists in the fact that the rotary electrical machine is oversized in relation to the average needs of the motor vehicle.

In this context, the objective of the present invention is to eliminate the aforementioned disadvantage.

SUMMARY OF THE INVENTION

For this purpose, the invention proposes a rotary electrical machine for a motor vehicle comprising:
a rotor which is supplied by an excitation current;
a stator which comprises a polyphase winding, and is coupled to the said rotor;
a thermal protection module which is designed to evaluate at least one temperature in the rotary electrical machine, and to compare the said at least one temperature with an associated thermal protection threshold;
a device for control of the rotor which supplies the excitation current according to an operating mode command received from a motor control unit of the motor vehicle, and according to the temperature comparison, such as to make the rotary electrical machine operate according to an operating mode from amongst:
a nominal generator mode, in which the machine is configured to provide a first maximum power; or
at least one extended generator mode, in which the machine is configured to provide a second maximum power greater than the first maximum power.

Thus, by controlling the rotary electrical machine in extended generator mode or in nominal generator mode by making the excitation current of the rotor vary, whilst protecting the said rotary electrical machine thermally, it is possible to use smaller rotary electrical machines which will be able to supply a maximum power as substantial as that of a rotary electrical machine of a higher class.

According to non-limiting embodiments, the electronic assembly can additionally comprise one or more additional characteristics from amongst the following:
a) The control device is designed to limit the excitation current of the rotor, in order to make the rotary electrical machine operate in the nominal generator mode if its temperature is higher than the associated thermal protection threshold;
b) The control device is designed to increase the excitation current of the rotor, in order to make the rotary electrical machine operate in the extended generator mode if its temperature is lower than the protection threshold determined, and if the control device receives an operating mode command in extended generator mode;
c) The adaptation of the excitation current is carried out according to a maximum excitation current cartography not to be exceeded according to the speed of the rotor, a cartography being associated with a given operating mode;
d) The thermal protection module is designed to evaluate the following three temperatures: a first temperature of the stator, a second temperature of power modules connected to the stator, and a third temperature of the control device;
e) The first temperature of the stator is a temperature value measured on the stator via a temperature sensor, or an estimated temperature value of the stator.
f) The estimated temperature value of the stator is based on: the ambient temperature, an increase in temperature between the ambient temperature and the temperature of the stator, the thermal capacity of the rotary electrical machine, the thermal conductance of the rotary electrical machine, and the equivalent losses of the stator;
g) The control device is designed to transmit to a motor control unit of the motor vehicle information relating to the operating mode of the rotary electrical machine;
h) The rotary electrical machine is an alternator-starter;
i) The rotary electrical machine is an alternator;
j) An extended generator mode can be used for a recuperative braking mode.

BRIEF DESCRIPTION OF THE DRAWINGS

The invention and its different applications will be better understood by reading the following description and examining the figures which accompany it.

DETAILED DESCRIPTION OF THE PREFERRED EMBODIMENT(S)

Elements which are identical in terms of their structure or function shown in different figures keep the same references, unless otherwise specified.

The rotary electrical machine 1 for a motor vehicle is described with reference to FIGS. 1 to 5.

Figure 1:
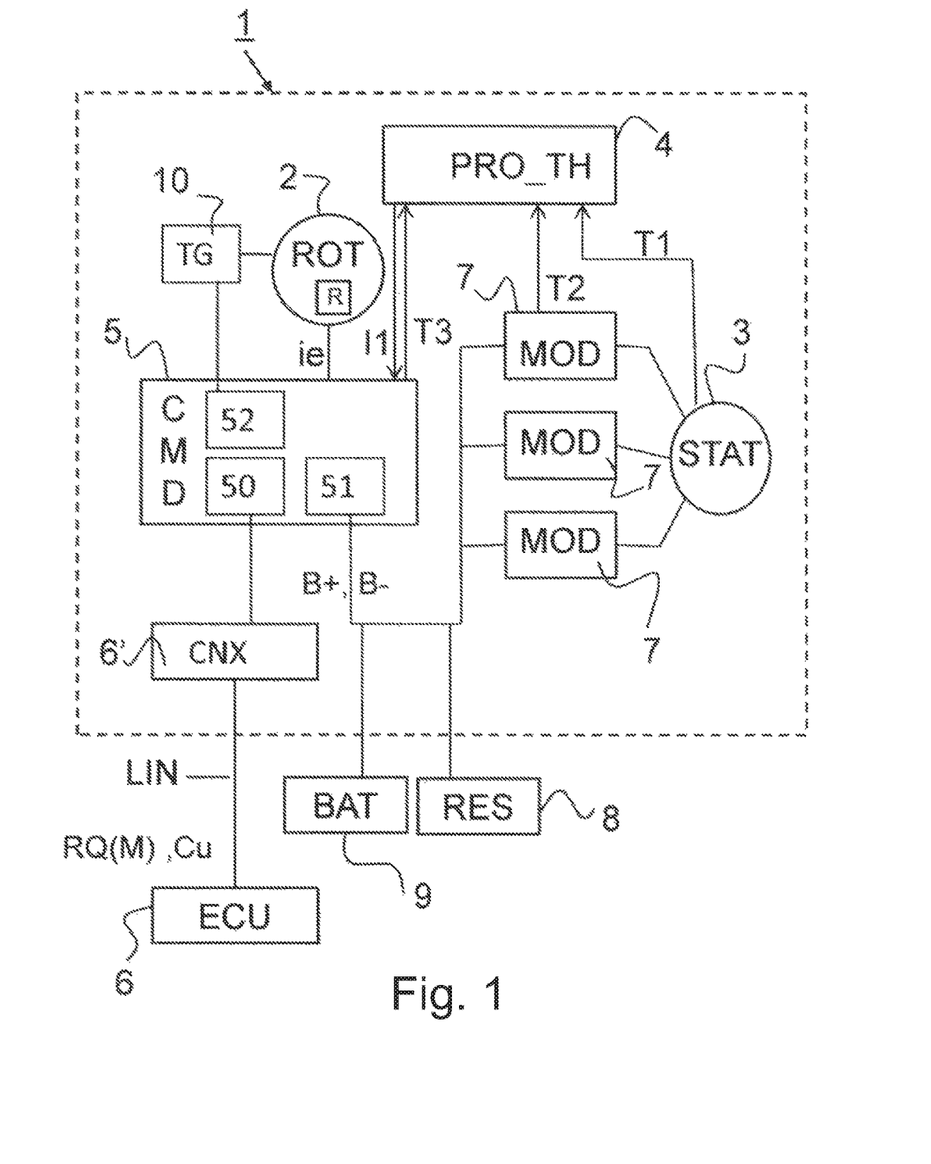
FIG. 1 represents a block diagram of a rotary electrical machine for a motor vehicle according to a non-limiting embodiment of the invention.

As illustrated in FIG. 1, according to a non-limiting embodiment, the rotary electrical machine 1 comprises:

a rotor ROT with the reference 2 supplied with an excitation current ie;

a stator STAT with the reference 3 which comprises a polyphase winding and is coupled to the said rotor 2;

a thermal protection module PRO_TH with the reference 4;

a control device CMD with the reference 5.

According to a first non-limiting embodiment, the rotary electrical machine 1 is a conventional alternator. In this case, the control device 5 can be integrated in the voltage regulator of the machine.

According to a second non-limiting embodiment, the rotary electrical machine 1 is a reversible machine which operates in motor mode or in generator mode, such as an alternator-starter. In this case, the control device 5 can be integrated in the control circuits of the reversible machine, and activated when the latter is operating in generator mode.

The different elements of the rotary electrical machine 1 are described in greater detail hereinafter.

The rotor 2 is an inductor into which an excitation current ie is injected.

A magnetic target TG with the reference 10 is secured on the rotor 2. The magnetic target 10, which is coupled to Hall-effect sensors 52 makes it possible to give the position of the rotor 2 which is necessary in order to make the machine operate in motor mode.

The stator 3 is connected via its phases to power modules 7, in this case three power modules, which form the inverter/rectifier bridge.

The thermal protection module 4 is designed to measure or estimate at least one temperature T in the rotary electrical machine 1, and to compare it with an associated thermal protection threshold th.

According to a non-limiting embodiment, three temperatures T are measured or evaluated, as follows:

a first temperature T1 of the stator 3;

a second temperature T2 of the power modules 7;

a third temperature T3 of the control device 5, and in particular of its electronic components.

The first temperature T1 of the stator 3 is:

k) a temperature value V1 measured on the stator 3 via a temperature sensor Ct (arranged directly on the chignons of the stator); or l) an estimated temperature value V2 of the stator 3.

In order to estimate the temperature value V2 of the stator 3, according to a non-limiting embodiment, the basis applied is:

m) the ambient temperature θamb of the rotary electrical machine 1 (provided by a chart);

n) a temperature increase Δt between the ambient temperature θamb and the temperature of the stator 3;

o) the thermal capacity Cth of the rotary electrical machine 1;

p) the thermal conductance Gth of the rotary electrical machine 1; and q) the equivalent losses Ps of the stator 3.

In a non-limiting embodiment, the third temperature T3 is measured by means of a temperature sensor of the CTN type.

As illustrated in FIG. 1, the control device 5 is:

connected to the rotor 2;

connected to a motor control unit ECU with the reference 6 via a signal connector CNX. In a non-limiting example it uses a LIN (Local Interconnect Network) communication bus in order to communicate with the said motor control unit 6;

connected to the on-board network RES with the reference 8 of the motor vehicle; and connected to the battery BAT with the reference 9 of the motor vehicle.

The control device 5 produces the excitation current ie of the rotor 2 according to an operating mode command RQ (also known as a control request) and to the said temperature comparison, such as to make the rotary electrical machine 1 operate according to an operating mode M from out of:

r) a nominal generator mode M1; or s) at least one extended generator mode M2, M2' with higher power.

According to a non-limiting embodiment, the control device 5 is designed to make the machine 1 operate in the extended generator mode M2 with power higher than that supplied in the nominal generator mode M1.

Higher power means that the rotary electrical machine 1 supplies a current higher than that which it would supply in the nominal generator mode M1. In other words, the rotary electrical machine 1 will have dimensions appropriate for the average current supplied in the nominal generator mode M1, but in the extended generator mode M2 it will be able to supply a current greater than that supplied in the nominal generator mode M1, as long as the thermal conditions permit it. Thus it will be possible to propose a rotary electrical machine with dimensions appropriate for the average current consumption of the vehicle, and no longer for the maximum consumption, whilst allowing the rotary electrical machine to function better than would be expected for its dimensions, thanks to the integrated thermal protection.

According to a non-limiting embodiment, there are two extended generator modes:

a first extended generator mode M2 which allows the rotary electrical machine 1 to output a current If greater than the current output during the nominal generator mode M1. According to a non-limiting embodiment, this mode M2 will typically intervene for periods dt ranging from a few minutes to about fifteen minutes;

a second extended generator mode M2', which corresponds for example to a recuperative braking mode, and allows the rotary electrical machine 1 to output a current If greater than the current output during the first extended generator mode M2. According to a non-limiting example, this mode M2' will typically intervene for periods dt ranging from a few seconds to a few tens of seconds.

Figure 2:
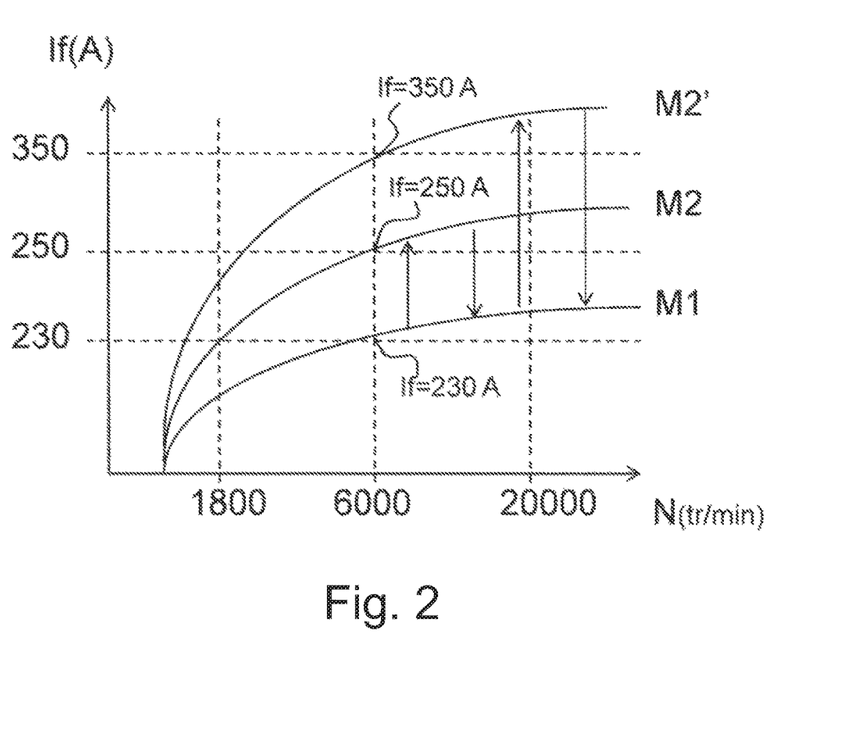
FIG. 2 shows curves representing a current output by the rotary electrical machine in FIG. 1 for different operating modes.

In a non-limiting embodiment, FIG. 2 illustrates the current If output from the rotary electrical machine for the different generator modes presented. The X-axis indicates the speed of rotation of the rotor 2 in revolutions per minute (N), and the Y-axis indicates the current output If.

As illustrated in the figure, in non-limiting examples:
the nominal generator mode M1 allows the rotary electrical machine to output a current If of 230 A at 6000 rpm;
the first extended generator mode M2 allows the rotary electrical machine 1 to output a current If of 250 A at 6000 rpm;
the second extended generator mode M2' allows the rotary electrical machine 1 to output of current If of 350 A at 6000 rpm.

Thus, the rotary electrical machine 1 has dimensions suitable for outputting 230 A at 6000 rpm continually in the non-limiting example taken. In this example taken, the rotary electrical machine 1 is known as class 23. Thus, there is a rotary electrical machine of class 23, which, for a certain short period dt dependent on the thermal conditions, can supply a current If of 250 A, or even 350 A, thus corresponding to a machine of a higher class, i.e. 25 or even 35.

The dimensioning of a rotary electrical machine 1 of this type is carried out as follows.

In a conventional alternator, when the excitation current which is supplied to the wound rotor has a duty cycle of substantially 100%, with the excitation current being a pulse width modulated signal (PWM signal), the alternator can supply its maximum power close to the nominal power of the machine. The size of the electrical resistance of the rotor winding is such that, when the excitation current is at its maximum (duty cycle at 100%), a maximum magnetic excitation flux is produced in the machine 1. In a machine 1 according to the invention, which in its nominal generator mode is equivalent to the aforementioned conventional alternator, the electrical resistance R of the rotor excitation winding must be substantially lower than that of this conventional alternator, such as to be able to inject more excitation current, and thus obtain the power corresponding to the extended generator mode. Thus for example, in the nominal generator mode, the maximum excitation current will be at 60% of the duty cycle, and at 80 and 100% in the extended generator modes M2 and M2'.

The motor control unit 6 transmits the operating mode command RQ to the control device 5. It is this unit 6 which knows the current requirements of the motor vehicle consumers. In non-limiting examples, the consumers of the vehicle are:
electric de-icing;
a rear window heating system;
a heating system for the seats;
an electric compressor for the air conditioning;
a radio;
the lighting and signalling lights, etc.

Thus, as will be seen hereinafter, at the request of the motor control unit 6, and according to the three temperatures evaluated T1, T2, T3, the control device 5 will modify the excitation current ie such that, in extended generator mode, the rotary electrical machine 1 supplies more current to the on-board network 8 of the motor vehicle, when the current requirements by the consumers on the on-board network are high.

Figure 3:
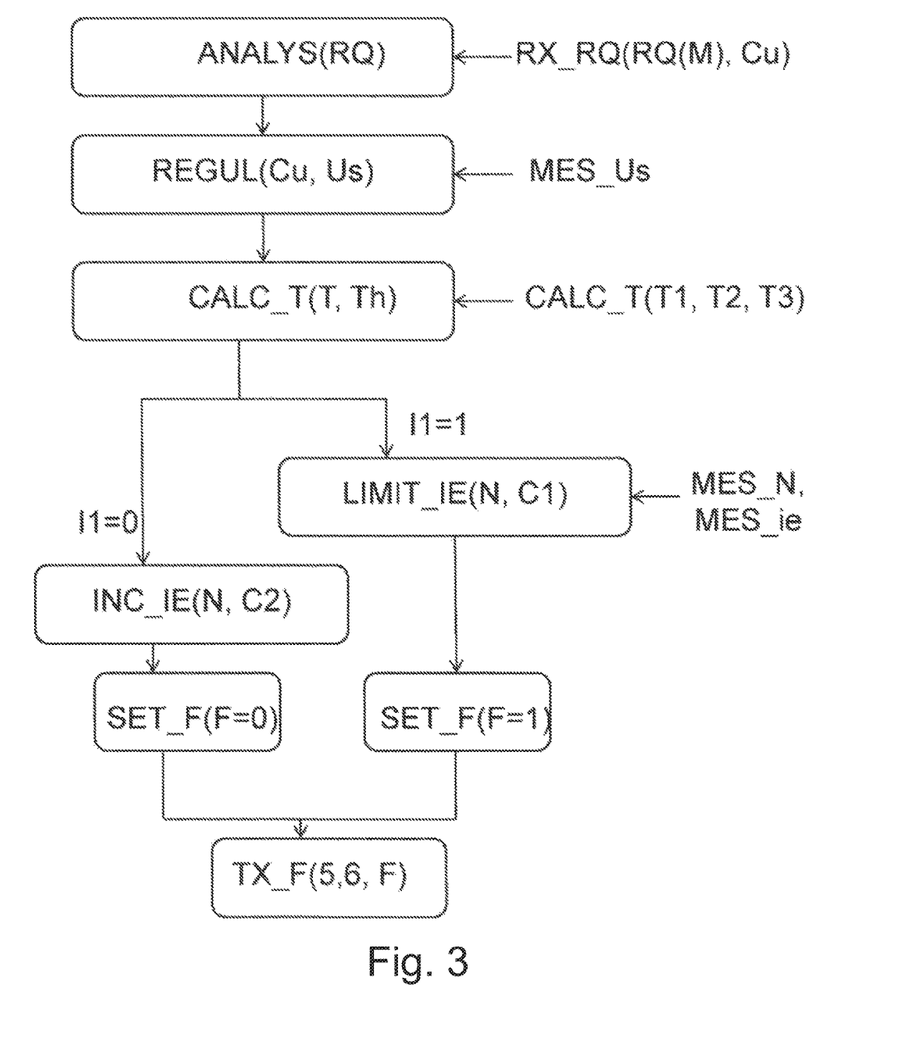
FIG. 3 illustrates different functions carried out by the rotary electrical machine in FIG. 1.

FIG. 3 shows a functional flowchart of the functions carried out by the different elements of the rotary electrical machine 1, in order to allow it to function according to a given generator mode M.

The control device 5 is designed to carry out reading of the LIN communication bus. It thus acquires information transmitted by the motor control unit 6 via the LIN communication bus (function RX(RQ(M),Cu)).

The information received by the control device 5 is:
an operating mode command RQ. In a non-limiting example, the first extended generator mode M2 command RQ is received. The motor control unit 6 thus asks the rotary electrical machine 1 to supply more current. This will be the case for example just after starting of the thermal engine of the vehicle, when it is cold. In fact, in this last case, the on-board network of the vehicle must supply a very high current for numerous consumers of the vehicle (systems for de-icing, heating, etc.). It will be noted that a de-icing time lasts approximately 5 minutes, and is therefore shorter than the transitory 15 minute period of the first extended generator mode M2;
a set voltage Cu in order to allow the control device 5 to regulate the on-board network 8 to this voltage value. In a non-limiting example, the set voltage is equal to 14.5 V.

The control device 5 analyses the operating mode command RQ obtained from the motor control unit 6 (function ANALYS(RQ)), and it regulates the voltage of the rotary electrical machine 1 (function REGUL(Cu, Us). In order to regulate the voltage, the control device measures the voltage Us at the terminals of the rotary electrical machine 1 (function MES_Us) and compares it with the set voltage Cu.

The thermal protection module 4 evaluates the thermal protection of the machine (function CALC_T(T, Th)). For this purpose, the module 4 measures or estimates at least one temperature T in the machine 1, and compares it with an associated thermal protection threshold Th. In the non-limiting embodiment, the module 4 measures or estimates the first temperature T1 of the stator 3, the second temperature T2 of the power modules 7, and the third temperature T3 of the electronic components of the control device 5, and compares them with respective associated thermal protection thresholds Th1, Th2 and Th3.

Figure 4:
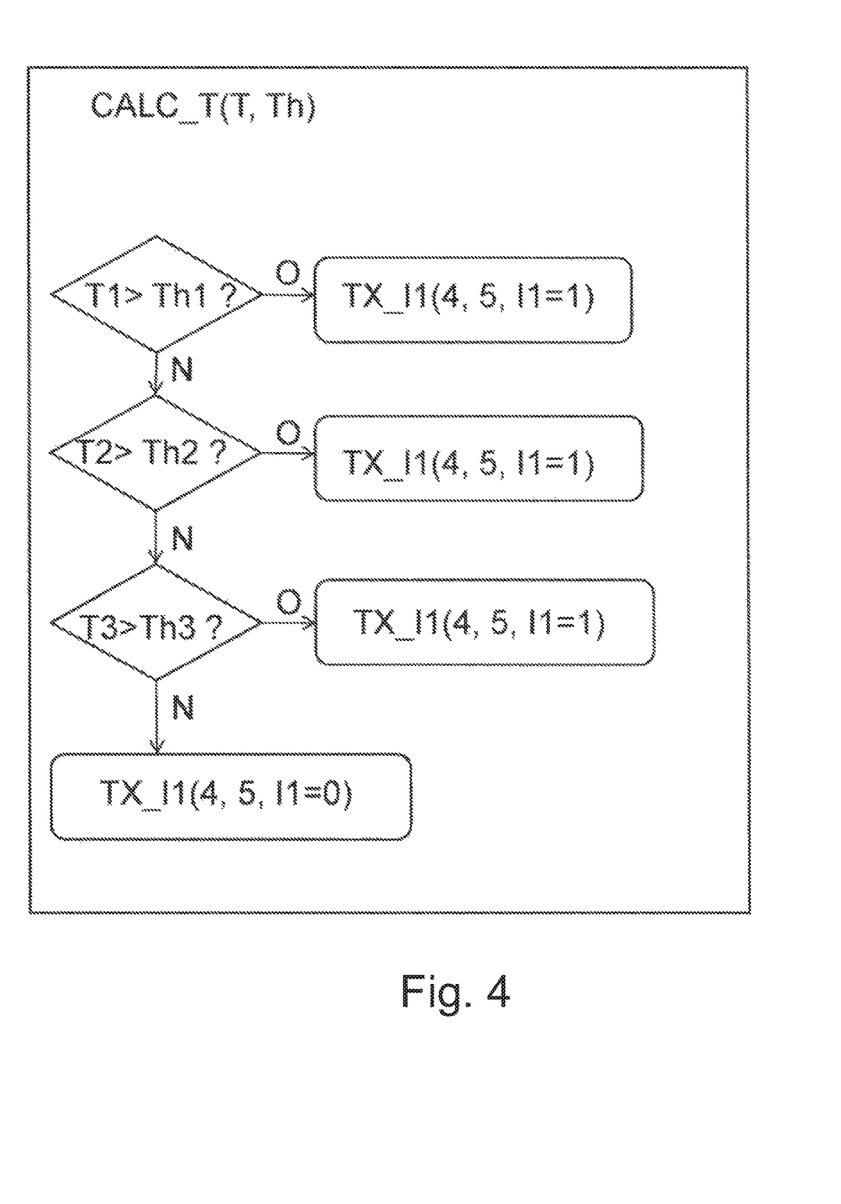
FIG. 4 represents a flow chart of a thermal evaluation carried out by a thermal protection module of the rotary electrical machine in FIG. 1.

With reference to FIG. 4, the evaluation CALC_T comprises the following steps:
the thermal protection module 4 compares the first temperature T1 with a first thermal protection threshold Th1. If it is higher than the first threshold Th1, the thermal protection module 4 sends a thermal protection order l1 to the control device 5 in order to indicate to it that the machine cannot operate in extended generator mode M2 as requested, since it has reached its maximum temperature authorised in the stator (function TX_l1(4,5,l1=1) illustrated). This information l1 is for example a flag positioned at 1;
in the negative case (when the first temperature T1 is below the first threshold Th1), the thermal protection module 4 compares the second temperature T2 with the second thermal protection threshold Th2. If it is higher than this second threshold Th2, the thermal protection module 4 transmits the thermal protection order l1 to the control device 5, in order to indicate to it that the machine cannot operate in extended generator mode M2 as requested, since it has reached its maximum temperature authorised in the power modules (function TX_l1(4,5,l1=1) illustrated). The flag l1 is positioned at 1;

in the negative case (when the second temperature T2 is below the second threshold Th2), the thermal protection module 4 compares the third temperature T3 with the third thermal protection threshold Th3. If it is higher than this third threshold Th3, the thermal protection module 4 transmits the thermal protection order l1 to the control device 5, in order to indicate to it that the machine cannot operate in extended generator mode M2 as requested, since it has reached its maximum temperature authorised in the electronic components of the said control device 5 (function TX_l1(4,5,l1=1) illustrated). This flag l1 is positioned at 1;

in the negative case (when the third temperature T3 is below the third threshold Th3), the thermal protection module 4 transmits the thermal protection order l1 to the control device 5, in order to indicate to it that the machine can operate in extended generator mode M2 as requested, since it has not reached its maximum temperature authorised, whether this is in the stator 3, in the power modules 7, or in the electronic components of the said control device 5 (function TX_l1(4,5,l1=0) illustrated). The flag l1 is positioned at 0.

Thus, the rotary electrical machine 1 is protected thermally, and its operation in extended generator mode is or is not authorised according to its thermal conditions.

It will be appreciated that the comparisons of the different temperatures T1 to T3 can be carried out in an order different from that described above.

With reference once again to FIG. 3, when the control device 5 receives the thermal protection order l1, according to this order l1 and therefore to comparisons of the temperatures measured or evaluated T1, T2, T3 with their respective threshold Th1, Th2, Th3, it will adapt the excitation current ie which supplies the rotor 2 as follows.

The control device 5:
a) limits the excitation current ie of the rotor 2 in order to make the rotary electrical machine 1 operate in the nominal generator mode M1 if the temperature T becomes higher than a given protection threshold Th (function LIMIT_IE(N, C1). In other words, if the control device receives the order l1=1, it limits the current ie. In this case, the current output if of the machine 1 is limited to the output of the nominal generator mode M1;
b) increases the excitation current ie of the rotor 2, in order to make the rotary electrical machine 1 operate in the extended generator mode M2, if the temperature T is lower than a given protection threshold Th, and if the control device 5 receives an operating mode command RQ in extended generator mode M2 (which is the case in the example taken). In other words, if the control device receives the order l1=0, it increases the current ie. In this case, the machine 1, which has dimensions such as to supply a nominal current If conventionally, can if necessary supply a current higher than If on the on-board network provided that the temperature T of the machine permits this. This step b) is carried out in the same way if the command RQ is an operating mode command M2'.

Figure 5:
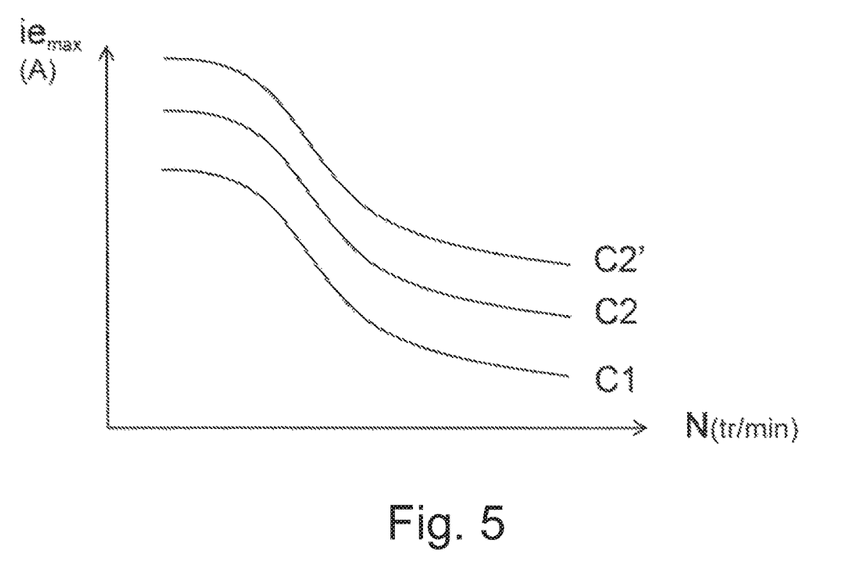
FIG. 5 shows curves representing a maximum excitation current which depends on the speed of the rotor of the rotary electrical machine in FIG. 1 for different operating modes.

According to a non-limiting embodiment, the adaptation of the excitation current ie is carried out according to a cartography C1, C2, C2' (or chart) of maximum excitation current $ie_{max}$ not to be exceeded, depending on the speed N of the rotor 2, a cartography C1, C2, C2' being associated with a respective operating mode M1, M2, M2'. On the Y-axis there is the maximum excitation current $ie_{max}$ in amps (A) not to be exceeded, and on the X-axis there is the speed of the rotor N in revolutions per minute (rpm). This cartography C1, C2 is a maximum level not to be exceeded for the safety of the rotary electrical machine 1. It is adapted to the control situation derived from the motor control unit 6. FIG. 5 shows that the maximum excitation current $ie_{max}$ not to be exceeded on the second cartographies C2, C2' is higher than the maximum excitation current $ie_{max}$ not to be exceeded on the first cartography C1, and that on the second cartography C2' is higher than that on the second cartography C2. Thus, the control device 5 increases or limits the current ie whilst ensuring that the said current ie is always lower than the maximum excitation current authorised $ie_{max}$.

It will be noted that the control device 5 is designed to measure the speed N of the rotor 2, and also to measure the excitation current ie which supplies the rotor 2. In fact, the speed N of the rotor is taken into account for the control of the excitation current. According to a non-limiting embodiment, the measurement of the excitation current ie is carried out via a shunt in the control device 5.

Thus, in the case a) of limitation of the excitation current ie (case in which at least one of the three temperatures T1, T2, T3 has reached its thermal protection threshold Th), the adaptation, and in this case the limitation of the excitation current ie is carried out according to the first cartography C1 associated with the nominal generator mode M1, since the extended generator mode M2 is no longer available.

In the case b) of increase of the excitation current ie (case in which none of the three temperatures T1, T2, T3 has reached its thermal protection threshold Th), the adaptation, and in this case the increase of the excitation current ie is carried out according to the second cartography C2 associated with the first extended generator mode M2, since this mode is available in the example taken (or according to the second cartography C2' associated with the second extended generator mode M2').

According to a non-limiting embodiment, the control device 5 is also designed to transmit to the motor control unit 6 of the motor vehicle information F relating to the operating mode of the said rotary electrical machine 1 (function TX_F(5,6, F) illustrated in FIG. 3). According to a non-limiting example, this information F is a flag.

In the case a) of limitation of the excitation current ie and thus the return to nominal generator mode M1, or lack of transition to the extended generator mode M2, the flag F is positioned at 1 (function SET_F(F=1)), although it will be appreciated that the thermal evaluation of the machine 1 is carried out continually. Also, if the temperatures T1, T2, T3 drop subsequently, such as to go back below their respective thresholds Th1, Th2, Th3, the machine will be able to go into extended generator mode M2 or M2'.

In the case b) of the increase of the excitation current ie, and thus transition to the first extended generator mode M2 in the example taken (or M2'), the flag F is positioned at 0 (function SET_F(F=0)).

The motor control unit 6 is thus notified whether its control request RQ with the extended generator mode M2 (in the example taken) has functioned or not.

It will be appreciated that the description of the invention is not limited to the application, embodiments and examples described above.

Thus, the present invention applies to any type of reversible polyphase rotary electrical machine, such as alternator-starters, which are driven for example by means of a belt or are integrated, and in particular for hybrid applications.

It will be appreciated that the description of the invention is not limited to the embodiments and examples described above.

Thus, the thermal protection module 4 can be integrated in the control device 5:

t) it makes it possible to propose a rotary electrical machine of a lower class, which is therefore smaller and less powerful, in order to fulfil temporarily the same requirements of the vehicle in terms of current as a higher class, by means of monitoring of temperature;

u) it makes it possible to provide an energy recuperation mode temporarily for a machine which is habitually designed to maintain the generator mode permanently;

v) it is simple to implement and inexpensive.

The invention claimed is:

1. Rotary electrical machine (1) for a motor vehicle, wherein said rotary electrical machine (1) comprises:
   a rotor (2) which is supplied by an excitation current (ie);
   a stator (3) which comprises a polyphase winding, and is coupled to said rotor (2);
   a thermal protection module (4) which is designed to evaluate at least one temperature (T) in the rotary electrical machine (1), and to compare said at least one temperature (T) with an associated thermal protection threshold (Th);
   a device (5) for control of the rotor (2) which supplies the excitation current (ie) according to an operating mode command (RQ) received from a motor control unit (6) of said motor vehicle, and according to said temperature comparison, such as to make the rotary electrical machine (1) operate according to an operating mode (M) from amongst:
   a nominal generator mode (M1), in which the machine is configured to provide a first maximum power; or
   at least one extended generator mode (M2, M2'), in which the machine is configured to provide a second maximum power greater than said first maximum power.

2. Rotary electrical machine (1) according to claim 1, wherein the control device (5) is designed to limit the excitation current (ie) of the rotor (2), in order to make the rotary electrical machine (1) operate in the nominal generator mode (M1) if its temperature (T) is higher than the associated thermal protection threshold (Th).

3. Rotary electrical machine (1) according to claim 2, wherein the control device (5) is designed to increase the excitation current (ie) of the rotor (2), in order to make the rotary electrical machine (1) operate in the extended generator mode (M2, M2') if its temperature (T) is lower than the protection threshold (Th) determined, and if the control device (5) receives an operating mode command (RQ) in extended generator mode (M2, M2').

4. Rotary electrical machine (1) according to claim 2, wherein the adaptation of the excitation current (ie) is carried out according to a maximum excitation current (ie$_{max}$) cartography (C1, C2) not to be exceeded according to the speed (N) of the rotor (2), a cartography (C) being associated with a given operating mode (M).

5. Rotary electrical machine (1) according to claim 2, wherein the thermal protection module (4) is designed to evaluate the following three temperatures (T):
   a first temperature (T1) of the stator (3);
   a second temperature (T2) of power modules (7) connected to the stator (3); and
   a third temperature (T3) of the control device (5).

6. Rotary electrical machine (1) according to claim 1, wherein the control device (5) is designed to increase the excitation current (ie) of the rotor (2), in order to make the rotary electrical machine (1) operate in the extended generator mode (M2, M2') if its temperature (T) is lower than the protection threshold (Th) determined, and if the control device (5) receives an operating mode command (RQ) in extended generator mode (M2, M2').

7. Rotary electrical machine (1) according to claim 6, wherein the adaptation of the excitation current (ie) is carried out according to a maximum excitation current (ie$_{max}$) cartography (C1, C2) not to be exceeded according to the speed (N) of the rotor (2), a cartography (C) being associated with a given operating mode (M).

8. Rotary electrical machine (1) according to claim 6, wherein the thermal protection module (4) is designed to evaluate the following three temperatures (T):
   a first temperature (T1) of the stator (3);
   a second temperature (T2) of power modules (7) connected to the stator (3); and
   a third temperature (T3) of the control device (5).

9. Rotary electrical machine (1) according to claim 1, wherein the adaptation of the excitation current (ie) is carried out according to a maximum excitation current (ie$_{max}$) cartography (C1, C2) not to be exceeded according to the speed (N) of the rotor (2), a cartography (C) being associated with a given operating mode (M).

10. Rotary electrical machine (1) according to claim 9, wherein the thermal protection module (4) is designed to evaluate the following three temperatures (T):
    a first temperature (T1) of the stator (3);
    a second temperature (T2) of power modules (7) connected to the stator (3); and
    a third temperature (T3) of the control device (5).

11. Rotary electrical machine (1) according to claim 1, wherein the thermal protection module (4) is designed to evaluate the following three temperatures (T):
    a first temperature (T1) of the stator (3);
    a second temperature (T2) of power modules (7) connected to the stator (3); and
    a third temperature (T3) of the control device (5).

12. Rotary electrical machine (1) according to claim 11, wherein the first temperature (T1) of the stator (3) is:
    a temperature value (V1) measured on the stator (3) via a temperature sensor (Ct); or
    an estimated temperature value (V2) of the stator (3).

13. Rotary electrical machine (1) according to claim 12, wherein the estimated temperature value (V2) of the stator (3) is based on:
    the ambient temperature θa;
    an increase in temperature (Δt) between the ambient temperature (θamb) and the temperature of the stator;
    the thermal capacity (Cth) of the rotary electrical machine (1);
    the thermal conductance (Gth) of the rotary electrical machine (1); and
    the equivalent losses (Ps) of the stator (3).

14. Rotary electrical machine (1) according to claim 1, wherein the control device (5) is designed to transmit to a motor control unit (6) of the motor vehicle information (F) relating to the operating mode (M) of the said rotary electrical machine (1).

15. Rotary electrical machine (1) according to claim 1, wherein said rotary electrical machine is an alternator-starter.

16. Rotary electrical machine (1) according to claim 1, wherein the said rotary electrical machine is an alternator.

17. Rotary electrical machine (1) according to claim 1, wherein an extended generator mode (M2') is a recuperative braking mode.

* * * * *